United States Patent [19]

Hoy et al.

[11] Patent Number: 4,814,382

[45] Date of Patent: Mar. 21, 1989

[54] SOLVENT BORNE HIGH SOLIDS COATING COMPOSITIONS

[75] Inventors: Kenneth L. Hoy, St. Albans; Forrest A. Richey, Jr., Charleston, both of W. Va.

[73] Assignee: Union Carbide Corporation, Danbury, Conn.

[21] Appl. No.: 916,324

[22] Filed: Oct. 7, 1986

[51] Int. Cl.$^4$ ............................................. C08L 29/02
[52] U.S. Cl. ................................... 525/113; 525/124; 525/131; 525/162; 525/328.8
[58] Field of Search ...................... 525/328.8, 113, 124, 525/131, 162; 524/197

[56] References Cited

U.S. PATENT DOCUMENTS

| | | | |
|---|---|---|---|
| 4,417,022 | 11/1983 | Chang | 524/598 |
| 4,515,835 | 5/1985 | Kuhn | 525/328.8 |
| 4,520,167 | 5/1985 | Blank | 525/131 |

Primary Examiner—Patricia Short
Attorney, Agent, or Firm—Eugene C. Trsutlein

[57] ABSTRACT

High solids coating composition comprising
(a) at least one film-forming organic polymer,
(b) at least one volatile organic compound,
(c) at least one cross-linking agent, and
(d) at least one reactive diluent comprising a surfactant-like carbamate, urea, and/or amide derivative having an HLB value of from about 8 to about 14.

5 Claims, No Drawings

SOLVENT BORNE HIGH SOLIDS COATING COMPOSITIONS

FIELD OF THE INVENTION

This invention relates to high solids coating compositions and, more particularly, to high solids coating compositions containing surfactant like carbamate, urea and/or amide derivatives as reactive diluents.

BACKGROUND OF THE INVENTION

In the past, coating compositions were commonly prepared by dissolving or dispersing film forming organic polymers in volatile organic compounds. Environmental and health concerns associated with applications involving large-scale vapor emissions have led to research in the development of coating compositions wherein the emission of volatile organic compounds is minimized.

Among the various methods of reducing the vapor emissions of coating compositions, the use of reactive diluents to replace all or part of the volatile organic solvent component of a coating composition is of particular interest. As used herein, the term "reactive diluent" refers to non volatile or nearly non volatile organic solvents or dispersants having as an integral part of their structures functional groups which are reactive with a film forming polymer and/or cross linking agent.

In addition to providing a low level of volatile emissions, a coating composition should have a sufficiently low viscosity to permit easy handling and application. Other desirable properties in a coating composition are sufficient stability to ensure a commercially acceptable shelf life and the ability to provide a cured coating having suitable properties such as toughness, adhesion, gloss, uniformity, impact resistance, abrasion resistance, scratch resistance, weatherability, and resistance to attack by solvents, acids, bases and other chemicals.

Coating compositions wherein all or a portion of the volatile organic solvent component thereof is replaced by a reactive diluent are illustrated by the following patents:

U.S. Pat. No. 4,417,022, to Chang et al. discloses coating compositions, the vehicle portion of which consists essentially of from about 60 percent to about 97 percent of a curable film-forming component and from about 3 percent to about 40 percent of an organic reactive diluent capable of chemically combining with the curable film forming component. Disclosed as reactive diluents are ethers having less than five ether groups, amides, esters, urethanes, ureas, sulfur containing compounds, and mixtures thereof which have one primary or secondary hydroxyl group. The reactive diluents disclosed by Chang et al. are further characterized as having a retained solids value of greater than about 80 percent, a hydroxyl equivalent of from about 180 to about 800, and a liquid viscosity of less than about 10 poise at 60° C. Preferred reactive diluents disclosed by Chang et al. are ester containing reactive diluents, with ester containing reactive diluents having allyl side chains being most preferred. Coating compositions having ester-containing reactive diluents to produce cured coatings which lack desirable adhesion, hardness and/or weatherability.

As a further example, U.S. Pat. No. 4,520,167 to Blank et al. discloses a coating compsition comprising (a) a hydroxyalkyl carbamate of the formula:

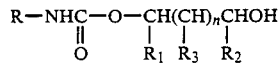

wherein n=0 or 1, R is a $C_1$ to $C_{20}$ organic moiety which may contain one or more constituents selected from the class consisting of hetero-atoms and hydroxyl groups, and each of $R_1$, $R_2$, and $R_3$ is independently H or $CH_3$; (b) an aminoplast cross-linker; and (c) a polymer containing active sites which at elevated temperature are reactive with the amide-aldehyde cross-linker (b). Blank et al. exemplifying as suitable reactive diluents compounds of the formula:

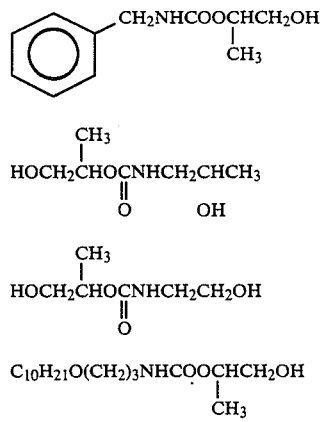

Cured coatings formed from the coating compositions containing the reactive diluents exemplified by Blank et al. are, within a range of environmentally acceptable formulations, widely variable as regards the surface properties possessed by same.

Among the compounds which have been offered for use as reactive diluents in coating compositions are dicyclopentenyl oxyethyl ethyl methacrylates, modified caprolactones, and unsaturated melamines. In general, these compounds are poor solvents, have relatively high viscosities and/or produce cured coatings having undesirable chemical and/or physical properties.

A cured coating's toughness, adhesion, impact resistance, abrasion resistance, scratch resistance, weatherability and resistance to chemical attack depend to a large extent upon the film-forming polymer and reactive diluent components of the composition used to produce same. As disclosed in U.S. patent application Ser. No. 759,172 filed on July 26, 1985, and U.S. patent application Ser. No. 807,738 filed on Dec. 11, 1985, both in the name of K. L. Hoy, et al., coating compositions containing carbamate and urea derivatives as reactive diluents are found to provide cured coatings having desirable toughness and adhesion.

The ability of a coating composition to form a defect-free film depends in part on (a) the ability of a composition to cover or "wet" a substrate and (b) the rheology of composition flow during coating application and cure.

A coating composition's ability to "wet" a substrate is related to the degree of surface energy which exists between the coating composition and the substrate surface. As the industry has moved to higher solid content compositions to satisfy ecological considerations, the molecular weight, functionality and geometry of the coating polymers have been lowered, increased and altered, respectively, to minimize the viscosity of the polymer which is required for application of the composition contents. In doing so, the wetting of the substrate by the coating compositions has been degraded to the point where many coatings have marginal film forming properties. Indeed, molecules having a higher reactive polar functionality content (increased cohesive character) tend to associate with themselves rather than orient towards the substrate surface. In doing so they tend to pull away from the substrate surface, especially at points of substrate imperfection. The tendency of a coating to shrink away from a substrate surface results in various types of coating defects, a more severe form of which is termed "cratering". Cratering refers to a surface defect caused by a coating composition covering patches of a substrate surface very thinly and other areas of the substrate more thickly, giving rise to the appearance of gullies or "craters" in the finished coating.

In order to reduce the severity of surface defects caused by the inability of a composition to properly wet a surface, common practice is to provide a coating composition with one or more anti-cratering additives which, typically, are surfactants. Owing to its biphilic nature, a surfactant additive is effective in reducing the surface energy at coating substrate interfaces of high chemical potential, thereby improving the ability of the coating to wet a substrate surface. These materials, however, tend to exude and migrate to the substrate and surface of the coating during curing. In the extreme, they can cause loss of adhesion, film haze (loss of gloss), and loss of corrosion protection, all of which are serious defects in a coating system.

Flow properties of a coating composition depend to some extent on the composition's viscosity. Compositions having higher viscosities generally flow onto substrate surfaces less evenly than compositions having lower viscosities. Coating compositions having poor flow ability tend to produce cured coatings having uneven or irregular surfaces. Among the imperfections attributed to poor composition flow is a surface appearance which, as a result of its resemblance to the rind of an orange, is termed "orange peel". For several applications (e.g., automotive and appliance finishes), the loss of surface uniformity and gloss resulting from orange peel is deemed a commercially unacceptable surface defect. Coatings art teaches that the addition of a high boiling but volatile "reflow" or "tail" solvent will circumvent many of these undesirable flow properties. This formulation strategy provides for the applied coating to flow and level during the early part of a curing cycle before chain extension and cross linking reactions can take place. This practice does, however, contribute to the volatile emissions and in the case of polymer systems designed for high solids finishes, results in the surface defects previously decribed.

The optimum viscosity for a given coating application depends in part on the method by which the coating is applied. For example, low pressure spray applications may require the use of lower viscosity compositions than high pressure spray applications. As previously noted, reactive diluents oftentimes increase the viscosities of the coating compositions into which they are incorporated. Undesirably high composition viscosities are commonly reduced by volatile organic compound addition. Owing to the environmental constraints on volatile organic compound emission levels, reactive diluent containing compositions typically have relatively narrow formulation ranges.

Accordingly, it is an object of this invention to provide a high solids coating composition suitable for use in the production of cured coatings having commercially acceptable chemical and physical properties.

It is a further object of this invention to provide a high solids coating composition capable of providing cured coatings having optimum surface appearance.

Additionally, it is an object of this invention to provide a high solids coating composition which may be formulated over a relatively broad compositional range.

SUMMARY OF THE INVENTION

It has now been found that coating compositions containing a reactive diluent comprising a surfactant like carbamate, urea, and/or amide derivative provide cured coatings which, in addition to having desirable toughness and adhesion, generally exhibit uniform surface appearances.

In one embodiment this invention relates to a coating composition which comprises:
(a) at least one cross linkable organic polymer,
(b) at least one volatile organic compound
(c) at least one cross-linking agent; and
(d) at least one reactive diluent comprising a surfactant like amide, urea and/or carbamate derivative having an HLB value, as hereinafter defined, of from about 8 to about 14.

In a further embodiment this invention relates to a coating composition which comprises:
(a) at least one cross linkable organic polymer,
(b) at least one volatile organic compound,
(c) at least one cross linking agent, and
(d) a surfactant-like reactive diluent comprising a compound of the formula:

$$A[(B)_xR]_y \qquad \text{Formula I}$$

wherein
A is a radical selected from the group consisting of

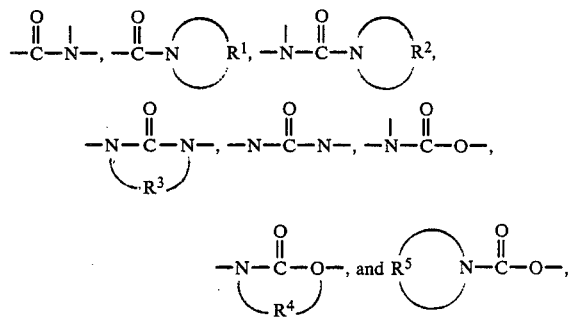

wherein
$R^1$, $R^2$, and $R^5$ are diluent radicals of the formula $-C_nH_{2n}-$ wherein n is 4 or 5, or radicals of the formula $-C_2H_4OC_2H_4-$, and wherein
$R^3$ and $R^4$ are divalent radicals of the formula $-C_mH_{2m}-$ wherein m is 2 or 3,
B is an oxyalkylene or polyoxyalkylene radical comprising 1 to 5 units comprising oxyethylene and/or oxypropylene and/or oxybutylene radicals;
R is hydrogen or a monovalent radical selected from the group consisting of an hydroxyl radical, alkyl radicals having 1 to about 12 carbon atoms and hydroxyalkyl radicals having 2 to about 12 carbon atoms, with the proviso that R may not be hydrogen when adjacent to an oxygen atom bonded to a

(group, and the further proviso that R may not be an hydroxyl radical when adjacent to an oxygen atom;
x has a value of 0 or 1; and
y is an integer having a value of 1 to 4 corresponding to the valency of A, wherein B, x and R may be the same or different for each value of y,
and wherein the Formula I compound defined thereby has (a) a molecular weight not in excess of about 400;
(b) a single R at least as hydrophobic as a butyl radical;
(c) at least one, preferably at least 2, moiety(s) selected from the group consisting of primary and secondary —NH radicals and primary and secondary —OH radicals, with the proviso that said Formula I compound may not contain an hydroxyl radical on a carbon atom which is alpha to either a nitrogen atom or an oxygen atom; and
(d) an HLB value of from about 8 to about 14. Preferably the reactive diluents of this invention contain a single hydroxyl radical.

A "surfactant like" reactive diluent is herein defined as a molecule having hydrophobic and hydrophilic segments which are segregated in such a manner as to provide the molecule with surface active properties. A monovalent radical R at least as hydrophobic as a butyl radical is a radical which provides a stable Formula I compound having at least that degree of hydrophobicity as an otherwise identical compound wherein said R is butyl. In addition to alkyl radicals having 4 to about 12 carbon atoms, monovalent radicals herein defined as being at least as hydrophobic as a butyl radical include alkylsilyl radicals (e.g., methylsilyl radicals), perfluoroalkyl radicals (e.g., perfluoromethyl), and the like.

As used herein a "primary —NH radical" is an —NH radical of a primary amine, a "secondary—NH radical" is an —NH radical of a secondary amine, a "primary —OH radical" is an —OH radical bonded at a primary position in a carbon chain, and a "secondary —OH radical" is an —OH radical bonded at a secondary position in a carbon chain.

DETAILED DESCRIPTION OF THE INVENTION

Amide, carbamate and urea derivatives are particularly well suited for use as reactive diluents in coating compositions formulations. In general, such derivatives are found to provide coating compositions having desirable adhesion, hardness, impact resistance, and chemical resistance. However, the surface properties of cured coatings produced from compositions containing these derivatives is subject to wide variation.

Without wishing to be bound by theory, it is believed that the improvement in surface appearance observed in cured coatings prepared from compositions containing a surfactant-like reactive diluent as previously described is attributable to the composition having enhanced wetting ability and/or flow ability. For purposes of this invention, a surfactant like reactive diluent is defined as a diluent having affinity for both polar and nonpolar surfaces.

The surfactant-like reactive diluents of this invention are defined as having an HLB value of from about 8 to about 14, preferably from about 9 to about 13, and, most preferably, from about 9 to about 11. For purposes of this invention, an HLB value is a number on a scale of from 0 to 20, wherein 0 is the HLB value of a molecule which is entirely hydrophobic (e.g., butane), and 20 is the HLB value of a molecule which is entirely hydrophilic (e.g., polyethylene glycol), which describes the hydrophilic-lipophilic balance of a given compound. HLB values provided herein are defined as the weight percent of the hydrophilic segment of a reactive diluent divided by five.

For purposes of this invention, the hydrophilic segment of a carbamate, amide or urea derivative is that part of the compound which remains after the segment defined as a monovalent radical which is at least as hydrophobic as a butyl radical and all other segments which are unsubstituted alkyl groups are removed from the compound. Pursuant to this definition, that portion of 2 hydroxyethyl methylcarbamate which remains after a methyl group is removed therefrom represents the compound's hydrophilic segment. As defined herein, 2 hydroxyethyl methylcarbamate has an HLB value of 17.5. Similarly, the hydrophilic segment of 2-hydroxy-1-propyl 1-butylcarbamate is considered to be that portion of the compound which remains after a methyl group and a butyl group are removed therefrom. As defined herein, the HLB value of 2-hydroxy-1-propyl 1-butylcarbamate is is 11.7.

Among the reactive diluents suitable for use in the practice of this invention are carbamate derivatives represented by Formula I as heretofore described, wherein B, x and R are as previously described, y is an integer having a value of 1 or 3, and A is a radical selected from the group consisting of

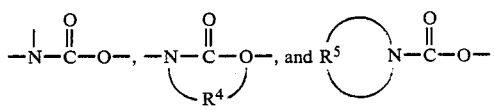

wherein $R^4$ and $R^5$ are as previously described.

Included among the carbamate derivatives useful in the practice of this invention are alkylcarbamates having hydroxy substituted alkyl groups such as, for example, 2-hydroxyethyl 1-butylcarbamate, 2-hydroxyethyl 1-hexylcarbamate, 2-hydroxyethyl 2-ethyl-1-hexylcarbamate, 2-hydroxyethyl 1-dodecylcarbamate, 2-hydroxy-1-propyl 1-butylcarbamate, 1-hydroxy-2-propyl 1-butylcarbamate, 1,3-dihydroxy-2-propyl 1-butylcarbamate, 2,3 dihydroxy-1-propyl 1-butylcarbamate, 2-methyl-1-propyl 2-hydroxyethyl carbamate, 1-butyl 2-hydroxyethylcarbamate, and the like; alkylcarbamates having hydroxyalkyleneoxy or hydroxypolyalkyleneoxy groups such as, for example, 1-butyl 2-(2-hydroxyethoxy)ethylcarbamate, 2-methyl 1-propyl 2-(2-hydroxyethoxy)ethylcarbamate, 1-hexyl 2-(2-hydroxyethoxy)ethylcarbamate, 2-ethyl-1-hexyl 2-(2-hydroxyethoxy)ethylcarbamate, 1-butyl bis(2-(2 hydroxyethoxy)ethyl) carbamate, 2-(2-hydroxyethoxy)ethyl 1-butylcarbamate, 2-(2-hydroxyethoxy)ethyl 1-hexylcarbamate, 2-(2-(2-hydroxyethoxy)ethoxy)-ethyl 1-butylcarbamate, and the like; oxazolidinones such as, for example, 3-(2-hydroxy 1-hexyl) oxazolidin 2-one, and the like; and oxazinones such as, for example, 3-(2-hydroxy 1-hexyl)oxazin 2-one, and the like.

For purposes of this invention preferred carbamate derivatives are compounds of the formula:

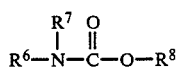

Formula II wherein $R^6$ is hydrogen, $R^7$ is alkyl radical having 1 to 12 carbon atoms that is at least as hydrophobic as a butyl radical and $R^8$ is an hydroxyalkyl radical having 2 to 3 carbon atoms, with 2-hydroxyethyl 1-butylcarbamate, 2-hydroxyethyl 1-hexylcarbamate and 2-hydroxyethyl 2-ethyl 1-hexylcarbamate being most preferred.

Several of the above-described alkyl carbamates having hydroxy-substituted ethyl or propyl radicals are produced by the reaction of a cyclic carbonate such as ethylene carbonate or propylene carbonate with an alkyl or alkanol amine. Similarly, a dialkylcarbonate such as dibutyl carbonate and an alkanol amine or an amino-substituted alkane diol may be reacted to produce alkyl carbamates having mono- or dihydroxy-substituted alkyl groups. In a similar manner, an alkyl carbamate having a polyalkyleneoxy group may be prepared by the reaction of a polyalkyleneoxyamine and a dialkyl carbonate. As disclosed by T. Asano et al., at pp. 311–312 of an article entitled "Formation of Carbamate Derivatives by Reaction of Chloromethyloxirane or Phenyloxirane with Carbon Dioxide and Aliphatic Amines", published in 1978 by the Chemical Society of Japan in *Chemistry Letters,* alkyl substituted oxazinones may be prepared by reacting an alkylammonium alkyl carbamate with epichlorohydrin. Oxazolidinones may be prepared by the reaction of an alkyl substituted dialkanol amine (e.g., 2-hydroxyethyl 2-hydroxyhexyl amine) with carbon dioxide.

Among the urea derivatives suitable for use herein are compounds represented by Formula I as heretofore described wherein B, x and R as are previously described, y is an integer having a value of 2 or 4 and A is a radical selected from the group consisting of

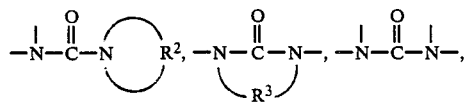

wherein $R^2$ and $R^3$ are as previously described. Included among the above described urea derivatives are N-hydroxyalkyl-N'- alkyl ureas such as, for example, N-(2-hydroxyethyl)-N'-1-butyl urea, N-(2-hydroxyethyl)-N'- 1-hexyl urea, N-(2-hydroxyethyl)-N'-(2-ethyl-1-hexyl) urea, N-(2-hydroxyethyl)-N'-1-dodecyl urea, N-(2-hydroxy-1-propyl)-N'-1-butyl urea, N-(1-hydroxy-2-propyl)-N'-1-butyl urea and the like; N-hydroxyalkyl-N-alkyl ureas such as, for example, N-(2-hydroxyethyl)-N-1-butyl urea, N-(2-hydroxyethyl)-N-1-hexyl urea, N-(2-hydroxy-1-propyl)-N-1-butyl urea, and the like; N,N-bis(hydroxyalkyl)-N'-alkyl ureas such as for example, N,N-bis(2-hydroxyethyl)-N'-1-butyl urea, N,N-bis(2-hydroxyethyl)-N'-1-hexyl urea and the like; ureas having alkyleneoxy or polyalkyleneoxy groups such as, for example, N-(2-(2-hydroxyethoxy)-ethyl)-N'-1-butyl urea, N-(2-(2-hydroxyethoxy)ethyl)-N'-(2-ethyl-1-hexyl) urea, N-(2-(2-(2-hydroxy-ethoxy)ethoxy)ethyl)-N'-1-butyl urea, N-(2-(2-(2-hydroxyethoxy)ethoxy)ethyl)-N'-(2-ethyl-1-hexyl) urea, and the like; imidazolidinones such as, for example, 1-(2-hydroxyethyl)-3-(2 hydroxy-1-hexyl)imidazolidin-2-one and the like; and pyrimidones such as, for example, 1-(2-hydroxyethyl)-3-(1-butyl)hexahydro-pyrimidin-2-one, and the like.

For purposes of this invention preferred urea derivatives are compounds of the formula

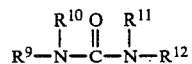

Formula III wherein $R^9$ is hydrogen, $R^{10}$ is an hydroxyalkyl radical having 2 to 3 carbon atoms, $R^{11}$ is hydrogen, and $R^{12}$ is an alkyl radical having 1 to 12 carbon atoms that is at least as hydrophobic as a butyl radical.

The preparation of N-hydroxyalkyl-N'-alkyl and N,N-bis(hydroxyalkyl-N'-alkyl) ureas by the reaction of alkanol amines with alkyl isocyanates is well known in the art. Similarly, ureas having polyalkyleneoxy groups may be prepared by reacting polyalkyleneoxyamines with alkyl isocyanates. Imidazolidinones may be prepared by reacting an alkanol amine with an epoxide to produce a dialkanol amine which is thereafter reacted with carbon dioxide and additional alkanolamine to produce the desired imidazolidinone.

Among the amide derivatives suitable for use herein are compounds represented by Formula I as heretofore described wherein B, x and R are as previously described, y is an integer having a value of 1 or 3, and A is a radical of the formula

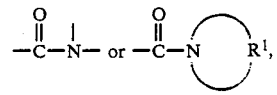

wherein $R^1$ is as previously described.

Illustrative of useful amide derivatives are N-(hydroxyalkyl)alkanoamides such as, for example, N-(2-hydroxyethyl) pentanoamide, N-(2-hydroxyethyl) heptanoamide, and the like; caproamides such as, for example, N-(1-butyl)-6-hydroxycaproamide, N-(1-hexyl)-6-hydroxycaproamide, and the like; N,N-bis(hydroxyalkyl) alkanoamides such as, for example, N,N-bis(2-hydroxyethyl) pentanoamide, N,N-bis(2-hydroxyethyl) heptanoamide, N,N-bis(2-hydroxyethyl) tridecanoamide, and the like; and amides having alkyleneoxy or polyalkyleneoxy groups such as, for example, N-(2-(2-hydroxyethoxy)ethyl) pentanoamide, N-(2-(2-hydroxyethoxy)ethyl) heptanoamide, N-(2-(2-(2-hydroxyethoxy)ethoxy)ethyl) pentanoamide, N-(2-(2-(2-hydroxyethoxy)ethoxy)ethyl) heptanoamide, N-N-bis(2-(2-hydroxyethoxy)ethyl) pentanoamide, N,N-bis(2-(2-hydroxyethoxy)ethyl) heptanoamide, and the like.

For purposes of this invention preferred amides are compounds of the formula

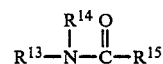

Formula IV wherein $R^{13}$ is hydrogen, $R^{14}$ is an alkyl radical having 1 to 12 carbon atoms that is at least as hydrophobic as a butyl radical, and $R^{15}$ is an hydroxyalkyl radical having 2 or 3 carbon atoms.

The reactive diluents used herein include compounds which exist in solid or liquid form at 25° C. However, solid diluents must be capable of being solubilized in use. For ease in handling and composition formulation, reactive diluents which are liquids at 25° C., preferably 0° C., are preferred.

Suitable cross linkable organic polymers for use in the present invention include polymers which contain a plurality of reactive —OH and/or —NHCO— groups, such as, for example: polyurethane resins, polyester alkyd resins, hydroxyl-containing epoxy fatty acid esters, hydroxyl-containing polyesters, hydroxyl-containing alkyd resins, hydroxyl-containing acrylic interpolymers, and hydroxyl-containing vinyl interpolymers, such as styrene/acrylic copolymers.

Illustrative of cross-linking agents suitable for use herein are methylol phenols such as, for example, 2,4,6-trimethylolphenol; polyepoxides such as, for example, glycidyl epoxides or cycloaliphatic epoxides, representative of which are Araldite ® 297, commercially available from Ciba-Geigy Corporation, and Epon ® 582, commercially available from Shell Oil Corporation; aminoplasts including the reaction product of an aldehyde (e.g., formaldehyde, acetaldehyde, paraformaldehyde, trioxane, etc.) with urea, thiourea, melamine, benzoguanamine, acetoguanamine, dicyandiamine and the like; polyisocyanates and blocked polyisocyanates; and the like.

Aminoplasts which are of particular value in high solids coating compositions are the methylated urea formaldehyde resins, the alkylated benzoguanamines and methylated melamine formaldehyde resins with methylated melamine-formaldehyde resins being the most desirable.

The relative quantities of cross-linkable polymer, volatile organic compounds, cross-linking agent, and reactive diluent present in a given composition are subject to variation, depending on factors which include: the solubility characteristics of the various composition components, properties required in a finished coating, economics, volatile organic compound emission limitations and the method of coating application.

In general coating compositions comprise from about 30 to about 70 weight percent of a combination of reactive diluent and volatile organic compound and from about 70 to about 30 weight percent of a combination of cross-linkable organic polymer and cross-linking agent, all based upon the total weight of the cross-linkable organic polymer, reactive diluent, volatile organic compound and cross-linking agent thereof.

The ratio of reactive diluent to volatile organic compound present in a given composition is largely dependent upon the solubility parameters of the cross-linkable organic polymer, reactive diluent and volatile organic compound employed therein. For example, coating compositions wherein the reactive diluent is a good solvent for the cross-linkable organic polymer can generally be formulated at higher reactive diluent to volatile organic compound ratios than coating compositions wherein the cross-linkable organic polymer is not as readily solubilized in the reactive diluent. The reactive diluent to volatile organic compound weight ratios of the coating compositions of this invention typically range from about 1/19 to about 3/2. Compositions wherein the reactive diluent to solvent weight ratio is within the higher region of this scale (i.e., in excess of about ½) are generally preferred for applications having relatively stringent volatile organic compound emission requirements.

It should be appreciated that a coating composition may be formulated at higher reactive diluent to volatile organic compound ratios than are described above (i.e., about 3/2 to about 9/1) and in use let down with volatile organic compound to attain a desired application viscosity.

Most preferably, a composition is provided with sufficient cross-linking agent to provide a cross-linkable organic polymer to cross-linking agent weight ratio of from about 9/1 to about 1/1.

The compositions of this invention may further comprise one or more cross-linking catalysts. Catalyst selection is usually dictated by the choice of cross-linking agent. For example, if aminoplasts having methoxymethyl functionality are employed to cross-link the organic polymer and reactive diluent, a strong acid catalyst is preferred. Illustrative of the strong acidic catalysts of the invention are one or more of the following: alkylsulfonic acids such as methane sulfonic acid, ethane sulfonic acid and the like, arylsulfonic acids such as p toluene sulfonic acid, alkylaryl sulfonic acids such as a $C_{10}$ to $C_{18}$ alkylbenzene sulfonic acid, and the like. Whereas, if aminoplasts having methoxymethyl methylol or methoxymethyl-imino functionality are employed as cross-linking agents, weak acid catalysts are preferred. Weak acid catalysts include one or more of the following: phosphate esters such as dialkyl hydrogen phosphates, aryl hydrogen phosphates and the like, as well as carboxylic acids having pKa values in excess of about 1.9 such as citric, maleic and phthalic acid. When the cross-linking agent is a diisocyanate or a blocked isocyanate, suitable catalysts include tertiary amines such as triethyl amine, bis(dimethylaminoethyl) ether and the like, organometallic salts of tin, mercury, zinc, bismuth and the like, such as dibutyl tin diacetate, zinc octoate, phenyl mercuric acetate and bismuth octoate.

The amount of catalyst required to promote the reaction is dependent upon the curing conditions required in the coating process employed. Those skilled in the art may readily determine the catalyst level with a routine amount of experimentation. In practice, if a catalyst is desired it is usually in the level of about 0.02 to about 2.5 percent by weight, based on the weight of the film-forming polymer.

In addition to the previously described components, the compositions of this invention may further comprise one or more additives such as are conventionally included in coating compositions.

Conventional additives include pigments, surface active agents, plasticizers, biocides, and antistatic agents. When present, the total amount of all such conventional additives typically does not exceed about 50 weight percent of the coating composition; the total amount of surface active agent and plasticizers present generally representing less than about 2 percent of the total composition weight.

In a preferred embodiment, this invention comprises a solvent borne high solids coating compositions comprising:

(a) a reactive diluent selected from the group consisting of 2-hydroxyethyl 1-butylcarbamate, 2-hydroxyethyl 1-hexylcarbamate and 2-hydroxyethyl 2-ethyl-1-hexylcarbamate;

(b) a cross-linkable organic polymer comprising an hydroxyl containing polyester or an hydroxyl-containing acrylic interpolymer wherein said film-forming polymer has an hydroxyl number of from about 30 to about 135, preferably from about 50 to about 100, and an hydroxyl functionality in excess of about 2, preferably of from about 3 to about 5;
(c) a volatile organic compound; and
(d) an aminoplast cross-linking agent, and, optionally,
(e) a cross-linking catalyst.

The following Examples serve to illustrate the instant invention. It is not intended that the scope of this invention be limited by these Examples. All Example percentages are by weight unless otherwise specified.

EXAMPLES

Comparative Example 1

Preparation of 2-Hydroxyethyl Methylcarbamate 44 grams (0.5 mole) of ethylene carbonate were placed in a 250-ml round bottom flask equipped with stirrer, addition funnel, and thermometer. 38.75 grams of 40% agueous methylamine (0.5 moles of methylamine contained in 23.3 grass of water) were charged to the addition funnel and added to the flask with stirring over 1.25 hr. at a rate sufficient to maintain the flask contents between 38° C. and 52° C. The resulting crude product was subjected to vacuum distillation giving 42.54 g of clear, colorless liquid product boiling at 140° C. at 8 mm Hg. The infrared spectrum of this material was consistent with the proposed structure. The HLB value of hydroxyethyl methylcarbamate calculated as previously described is 17.5.

EXAMPLE 1

Preparation of 2-Hydroxyethyl 1-Butylcarbamate 274.8 grams of ethylene carbonate (3.12 moles) were placed in a round bottom flask equipped with stirrer, thermometer, addition funnel and reflux condenser. 228.2 grams (3.12 mole) of butylamine were charged to the addition funnel and added to the flask at a rate sufficient to maintain the flask contents at 50°–80° C. The resultant reaction product was allowed to stand overnight. Thereafter, stripping of the reaction product in a rotary evaporator gave 449.9 g of crude product. A portion of the crude product was distilled at a pressure of 2 mm Hg, and a temperature of from 124° C. to 126° C. to purify same. The HLB value of 2-hydroxyethyl 1 butyl carbamate calculated as previously described is 12.9.

EXAMPLE 2

Preparation of Hydroxypropyl Butylcarbamates 290.96 grams (2.85 moles) of propylene carbonate were charged to a round bottom flask eguipped with a stirrer, heater, thermometer, addition funnel and reflux condenser. 211.3 grams (2.85 moles) of butylamine were charged to the addition funnel and slowly added to the flask contents. The maximum temperature of the flask contents during butylamine addition was 98° C. The resultant product was allowed to stand overnight. The infrared spectrum of the product was constant with the proposed structures (i.e., an isomeric mixture of 2-hydroxy-1-propyl 1-butylcarbamate and 1-hydroxy-2-propyl-1-butylcarbamate). The proposed structures given above were confirmed by Proton NMR analysis. The HLB value of 2-hydroxypropyl 1-butyl carbamate and 1-hydroxy-2-propyl-1-butyl carbamate calculated as previously described is 11.8.

EXAMPLE 3

Preparation of 2-Hydroxyethyl 1-Hexylcarbamate 90.7 grams (1.03 moles) of ethylene carbonate were placed in a flask, melted and stirred at about 50° C. 104.2 grams (1.03 moles) of n-hexylamine were then added drop wise over a 1½ hour period to the flask at a rate sufficient to maintain the flask contents at 60° to 70° C. The flask contents were held at 80° C. for an additional 5½ hours and then allowed to cool overnight. Infrared and NMR analyses of the resultant product were consistent with the proposed structure.

The HLB value of 2-hydroxyethyl 1-hexyl carbamate calculated as previously described is 11.0.

EXAMPLE 4

Preparation of 2-Hydroxyethyl 2-Ethyl-1-Hexyl-Carbamate 135 grams (1.5 moles, 98% pure) of ethylene carbonate were charged to a flask and heated to approximately 50° C. to melt it. 198 grams (1.5 moles, 98% pure) of 2-ethyl-1-hexylamine were charged to a dropping funnel and fed drop-wise to the stirred flask contents at a rate sufficient to maintain the reaction mixture at 70° C. during the addition. The resulting mixture was heated at 95° C. for an additional 10 hours. Infrared analysis of the resultant product was consistent with the proposed structure.

The HLB value of 2-hydroxyethyl 2-ethyl-1-hexyl carbamate calculated as previously described is 9.6.

EXAMPLE 5

Preparation of N-(2-Hydroxyethyl)-N'-1-Butyl Urea 61.7 grams (1 mole at 99% purity) of ethanolamine and 170 grams of dichloromethane were charged to a flask eguipped with stirrer, thermometer, feed tank, distillation head and condenser. 101 grams (1 mole at 98% purity) of butyl isocyanate were fed to the flask dropwise with stirring and cooling (utilizing a dry ice bath) over a period of 1.5 hours such that the temperature of the reaction mixture was maintained at about 30° C. At this time some solid had been formed and it was redissolved by heating to 46° C. The flask contents were stirred at 46° C. for an additional two hours and then freed of volatile materials by stripping at 90° C. and 2 mm Hg, leaving 181 g of solid product. This material was recrystallized from 2-butanone giving tiny white crystals melting at 67° C. The HLB value of N-(2-hydroxyethyl)-N'-1-butyl urea is 12.9.

EXAMPLE 6

Preparation of N-Hydroxypropyl-N'-Butyl Ureas 75.1 grams (1 mole) of 1 amino-2-propanol and 180 grams of dichloromethane were charge to a flask eguipped as in Example 2. To the resulting mixture was added 101 grams (1 mole at 98% purity) of butyl isocyanate dropwise with cooling and stirring during 1 hr 10 min and at a temperature of about 35° C. The flask contents were stirred for another 2 hours at 40° C., then freed of volatile materials by stripping at 80° C. and 2 mm Hg pressure, leaving 178.4 g of crude product which was a liguid. The infrared spectrum of the product was constant with the proposed structures (i.e., an isomeric mixture of N-(2-hydroxy-1-propyl)-N'-1-butyl urea and N-(1 hydroxy-2-propyl)-N'-1-butyl urea). The HLB value of N-(2-hydroxy-1-propyl)-N'-1-butyl urea and N-(1-hydroxy-2-propyl)-N'-1-butyl urea is 11.7.

EXAMPLE 7

Preparation of N-n-Butyl Lactic Amide 118.4 grams (1.0 mole) of ethyl lactate were charged to a flask eguipped with magnetic stirrer, thermometer, reflux condenser and pressure egualizing dropping funnel. 73.15 grams (1.0 mole) of n-butyl amine were charged to the dropping finnel and added drop wise over 50 minutes which, with external cooling was sufficient to keep the reaction temperature between 25 and 44° C. The reaction mixture was allowed to stand at room temperature overnight and then heated to 90° C. for about 5¼ hours to complete the reaction. The resulting crude product was freed of volatiles under vacuum (125° C. at 4 mm Hg) leaving a liguid product. Infrared and NMR analysis of the product was consistant with the proposed structure. The HLB value of N-n-butyl lactic amide is 10.1.

EXAMPLE 8

This Example illustrates the effect of various reactive diluents on the surface properties of cured coatings.

A base composition was formulated to the specifications of Table 1 by blending a mixture of the various composition components in a Cowles dissolver to provide a coarse dispersion which was thereafter transferred to a medium mill and blended to a Hegman value in excess of 6.

Thereafter, 1,080.4 grams of base composition was further blended with the reactive diluent and solvent components described in Table 2 to provide a series of coating compositions. The elution times of the various compositions, obtained by means of a #2 Zahn cup, are provided in Table 2.

A Binks Model 85 electrostatic air gun eguipped with a Binks E 63 PB air cap and a Binks D 63 B fluid nozzle was used to apply the various coating compositions described in Table 2 to 6 inch×12 inch panels of 22 gauge steel, obtained from Oxy Metal Industries Corporation as panels which had been pretreated with Bonderite ® 37 (Bonderite ® is a registered trademark of Parker Rust Proof Co.). The coating compositions were and atomization pressures employed in the spraying operation were as described in Table 3. The sprayed panels were then placed in a 300° F. oven for a period of 20 minutes to cure same. Definition of image (D.O.I.) and gloss data obtained from the cured panels is provided in Table 3. Definition of image values were obtained by means a D.O.I. 300 meter. Gloss data at angles of 60° and 20° from a plane per pendicular to the cured surface were obtained by means of a Glossgard ® II gloss meter. Glossgard ® is a registered trademark of Gardner Laboratory, Inc.

The data presented in Table 3 indicates that the coating compositions which contained a surfactant like reactive diluent produced cured coatings having surface properties which were superior to the surface properties of cured coatings produced from coating compositions having a chemically similar reactive diluent which was not surfactant-like. The data also illustrates that in general, the surface appearance and gloss of cured coatings produced from coating compositions containing a surfactant like reactive diluent were about as good as, and in some instances were better than, the surface properties of cured coatings produced from otherwise identical compositions lacking a reactive diluent.

TABLE 1

| BASE COMPOSITION | |
|---|---|
| Component | Quantity |
| acrylic resin[1]<br>(75 weight percent solids<br>in methyl amyl acetone) | 414.4 grams |
| n-butanol | 98.4 grams |
| silicon wetting agent[2]<br>(10 weight percent wetting agent<br>in xylene) | 0.5 grams |
| ethyl 3-ethoxy propionate | 33.0 grams |
| methyl amyl ketone | 84.0 grams |
| crosslinking agent[3] | 105.7 grams |
| crosslinking catalyst[4] | 5.4 grams |
| titanium dioxide | 339.0 grams |

[1]Commercially available from Rohm and Haas Co. under the product designation Acryloid ® 400 AT 400.
[2]Commercially available from Union Carbide Corporation under the product designation L 5310.
[3]A melamine resin commercially available from American Cyanamid Co. under the product designation Cymel ® 303.
[4]Commercially available from American Cyanamid Co. under the product designation Cycat ® 4040.

TABLE 2

| | COATING COMPOSITIONS | | | | | | | | | | | | |
|---|---|---|---|---|---|---|---|---|---|---|---|---|---|
| | Formulation | | | | | | | | | | | | |
| COMPONENT | 1 | 2 | 3 | 4 | 5 | 6 | 7 | 8 | 9 | 10 | 11 | 12 | 13 |
| 2-hydroxyethyl methyl carbamate | — | 62 g | — | — | — | — | — | — | — | 62 g | — | — | — |
| 2-hydroxyethyl 1-butylcarbamate | — | — | 62 g | — | — | — | 62 g | — | — | — | 62 g | — | — |
| 2-hydroxyethyl 1-hexylcarbamate | — | — | — | 58 g | — | — | — | — | — | — | — | 58 g | — |
| 2-hydroxyethyl 2-ethyl-1-hexylcarbamate | — | — | — | — | 58 g | — | — | 85.7 g | — | — | — | — | 58 g |
| MAK/EEP -blend[1] | 49 g | 49 g | 49 g | 49 g | 49 g | 31 g | 31 g | 31 g | 31 g | 31 g | 31 g | 31 g | 31 g |
| Elution Times | | | | | | | | | | | | | |
| #2 Zahn Cup (Sec) | 50 | 55 | 52 | 54 | 53 | 55 | 53 | 53 | 75 | 79 | 75 | 78 | 76 |

[1]A blend of 85 weight percent methyl amyl ketone and 15 weight percent ethyl 3-ethoxypropionate.

applied to the panels at a thickness of about 1±0.1 mil from a spray distance of 8 to 12 inches. Pot pressures

TABLE 3

| FORMULATIONS | DEFINITION OF IMAGE (50/10)[1] | GLOSS (50/10)[1] | | DEFINITION OF IMAGE (80/10)[2] | GLOSS (80/10)[2] | |
|---|---|---|---|---|---|---|
| | | 60° | 20° | | 60° | 20° |
| 1 | 65 | 91 | 70 | 70 | 90 | 63 |
| 2 | 55 | 83 | 46 | 55 | 77 | 32 |
| 3 | 60 | 89 | 61 | 70 | 89 | 59 |
| 4 | 70 | 89 | 63 | 70 | 89 | 59 |
| 5 | 55 | 85 | 47 | 70 | 88 | 55 |
| 6 | 65 | — | — | — | — | — |

TABLE 3-continued

| FORMULATIONS | DEFINITION OF IMAGE (50/10)[1] | GLOSS (50/10)[1] 60° | GLOSS (50/10)[1] 20° | DEFINITION OF IMAGE (80/10)[2] | GLOSS (80/10)[2] 60° | GLOSS (80/10)[2] 20° |
|---|---|---|---|---|---|---|
| 7 | 60 | — | — | — | — | — |
| 8 | 75 | — | — | — | — | — |
| 9 | — | — | — | 65 | 88 | 65 |
| 10 | — | — | — | 55 | 83 | 47 |
| 11 | — | — | — | 65 | 88 | 62 |
| 12 | — | — | — | 60 | 85 | 55 |
| 13 | — | — | — | 60 | 85 | 50 |

[1]spray conditions of 50 pounds of atomization air and 10 pounds of pot air
[2]spray conditions of 80 pounds of atomization air and 10 pounds of pot air

EXAMPLE 9

A base composition was formulated as previously described in Example 8 to the specifications of Table 4.

Thereafter 1144.8 grams of base composition, as described in Table 4, was further blended with a reactive diluent, as described in Table 5, to provide a series of coating compositions. The elution time of each of these coating compositions, as measured by a #2 Zahn cup, was 53 seconds.

The various coating compositions were then applied to 6 inch × 12 inch steel panels at atomization/pot pressures of 70 psi/10 psi, 60 psi/10 psi, 50 psi/10 psi and 40 psi/10 psi, cured and evaluated for definition of image (DOI) and gloss as described in Example 8, Additionally, the cured panels were assigned an orange peel rating on a scale of 1 to 10 wherein 10 represented a cured surface, visually perceived as uniform and smooth and 1 represented a surface having severe orange peel. DOI, gloss and orange peel data is provided in Table 5 as an average of the results obtained at the different atomization/pot pressures employed.

The data illustrates that at equimolar concentrations of reactive diluent, cured panels produced from coating compositions containing 2-hydroxyethyl 1-butyl carbamate, 2-hydroxyethyl 1-hexylcarbamate or 2-hydroxyethyl 2-ethyl 1-hexylcarbamate exhibited superior surface properties to cured panels produced from coating compositions containing 2-hydroxyethyl methylcarbamate. The data further indicates that, over a range of application pressures, as compared to otherwise identical compositions lacking a reactive diluent component, coating compositions containing a surfactant-like reactive diluent generally produced cured coatings having superior surface properties.

TABLE 4

BASE COMPOSITION

| Component | Quantity |
|---|---|
| acrylic resin[1] (75 weight percent solids in methyl amyl acetone) | 414.4 grams |
| n-butanol | 98.4 grams |
| silicone wetting agent[2] (10 weight percent wetting agent in xylene) | 0.5 grams |
| ethyl 3-ethoxy propionate | 42.7 grams |
| methyl amyl ketone | 138.7 grams |
| crosslinking agent[3] | 105.7 grams |
| crosslinking catalyst[4] | 5.4 grams |
| titanium dioxide | 339.0 grams |

[1]Commercially available from Rohm and Haas Co. under the product designation Acryloid ® 400 AT 400.
[2]Commercially available from Union Carbide Corporation under the product designation L 5310.
[3]A melamine resin commercially available from American Cyanamid Co. under the product designation Cymel ® 303.
[4]Commercially available from American Cyanamid Co. under the product designation Cycat ® 4040.

TABLE 5

| | | moles of Reactive Diluent | | | | | | | | | | | |
|---|---|---|---|---|---|---|---|---|---|---|---|---|---|
| | | HEMC[1] | | | HEBC[2] | | | HEHC[3] | | | HEEHC[4] | | |
| Film properties | Control | .39 | .52 | .71 | .29 | .39 | .52 | .24 | .33 | .44 | .21 | .29 | .39 |
| Dry Film Thickness | 1.0 | 1.0 | 1.3 | 1.4 | 1.2 | 1.4 | 1.4 | 1.2 | 1.3 | 1.4 | 1.1 | 1.3 | 1.4 |
| Gloss 60° | 89 | 84 | 87 | 84 | 87 | 89 | 89 | 88 | 89 | 89 | 88 | 89 | 87 |
| Gloss 20° | 58 | 46 | 55 | 46 | 53 | 56 | 59 | 62 | 59 | 58 | 56 | 61 | 59 |
| D.O.I. | 58 | 53 | 60 | 58 | 65 | 64 | 72 | 61 | 65 | 71 | 61 | 73 | 73 |
| Orange Peel | 4 | 7 | 6 | 7 | 7 | 8 | 9 | 6 | 8 | 8 | 6 | 8 | 8 |

[1]2-hydroxyethyl methylcarbamate.
[2]2-hydroxyethyl 1-butylcarbamate.
[3]2-hydroxyethyl 1-hexylcarbamate.
[4]2-hydroxyethyl 2-ethyl-1-hexylcarbamate.

What is claimed is:

1. A coating composition containing a hydroxy modified acrylic polymer; and 2-hydroxyethyl-1-butyl carbamate, 2-hydroxyethyl-1-hexyl carbamate, 2-hydroxyethyl-2-ethyl-1-hexyl carbamate or mixtures thereof, at least one volatile organic compound and at least one cross-linking agent.

2. A composition as defined in claim 1 wherein the carbamate is 2-hydroxyethyl-1-butyl carbamate.

3. A composition as defined in claim 1 wherein the carbamate is 2-hydroxyethyl-1-hexyl carbamate.

4. A composition as defined in claim 1 wherein the carbamate is 2-hydroxyethyl-2-ethyl-1-hexyl carbamate.

5. The cured product of the composition defined in claim 1.

* * * * *

UNITED STATES PATENT AND TRADEMARK OFFICE
CERTIFICATE OF CORRECTION

PATENT NO. : 4,814,382
DATED : March 21, 1989
INVENTOR(S) : K. L. Hoy et al.

It is certified that error appears in the above-identified patent and that said Letters Patent is hereby corrected as shown below:

Column 1, line 63, insert -- tend -- after "diluents".

Column 3, line 27 a hyphen should be inserted between "coating" and "substrate".

Column 10, lines 21 & 22, a hyphen should be inserted between "methoxymethyl" and "methylol".

Signed and Sealed this
Seventh Day of November, 1989

*Attest:*

JEFFREY M. SAMUELS

*Attesting Officer*     *Acting Commissioner of Patents and Trademarks*